United States Patent Office 3,135,718
Patented June 2, 1964

3,135,718
POLYMERIZATION OF FORMALDEHYDE
Kuno Wagner, Leverkusen, and Helmuth Kritzler, Cologne-Flittard, Germany, assignors to Farbenfabriken Bayer Aktiengesellschaft, Leverkusen, Germany, a corporation of Germany
No Drawing. Filed Apr. 19, 1960, Ser. No. 23,126
5 Claims. (Cl. 260—67)

The present invention relates to the polymerization of formaldehyde, and more especially to the polymerization of formaldehyde in the presence of acylation or alkylation agents.

It is known that formaldehyde hydrate esters are formed by the action of acylation agents on formaldehyde, for example methylene glycol diacetate is formed using acetic anhydride. In a reaction which proceeds in a similarly smooth manner, readily soluble liquid dimethyl ether derivatives of methylene glycol are formed from formaldehyde and alkylation agents, such for example as ethyl orthoformate, particularly in the presence of acids. The production of usable formaldehyde polymers are accordingly not possible hitherto when using the aforesaid solvents as reaction media, although just such a process would in fact produce considerable technical advantages (see further below).

It has now been found that monomeric substantially anhydrous formaldehyde can be polymerized while in contact with a formaldehyde polymerization catalyst to give a good yield of valuable polyoxymethylenes of high molecular weight by carrying through the polymerization in a liquid anhydrous medium containing an acylating or an alkylating agent for polyoxymethylene, said liquid medium being substantially free from hydrolysis products of said agents.

The process of the present invention makes it possible for the polymerization of monomeric gaseous or liquid formaldehyde, as well as trioxymethylene, to polyoxymethylene, and also the stabilization thereof by acylation or etherification, to be carried out in one and the same reaction system. This is performed by simply selecting in the second reaction phase an increased temperature which is necessary for the complete acylation or alkylation, which temperature ensures a reaction of the terminal groups, if required in the presence of catalysts, and leads to the stabilization of the polyoxymethylenes.

Suitable acylating agents for carrying out the process according to the invention are anhydrides of aliphatic, araliphatic, cycloaliphatic and aromatic carboxylic acids, having 2 to 20 carbon atoms and being devoid of non-benzenoid unsaturation, such as: anhydrides of acetic, propionic, searic, cyclohexyl carboxylic, phenyl acetic and benzoic acid, as well as substituted derivatives of these acid anhydrides, mixtures of the anhydrides with one another, as well as mixed anhydrides, such as the mixed anhydride of acetic and propionic acid.

In a preferred form of the present invention, acetic acid anhydride is used, since this anhydride proves to be most reactive in the acylation reaction carried out in the second phase. Furthermore, it is particularly suitable as a polymerization medium on account of its low solidification temperature (about —73° C.).

Suitable alkylation agents are for instance orthoformic and orthothioformic acid derivatives, for example the methyl, ethyl, propyl, butyl esters thereof; dimethyl sulphite, dimethyl and diethyl sulphate, silicic, titanic and boric acid esters with aliphatic, saturated monohydric alcohols having 1 to 4 carbon atoms, such as silicic acid tetramethyl and tetraethyl ester, titanic acid tetrabutyl ester; boric acid trimethyl, ethyl, propyl, butyl esters; acetals of formaldehyde, acetaldehyde, benzaldehyde or other aldehydes with aliphatic alcohols having 1 to 4 carbon atoms and ketals of acetone, methylethylketone, acetophenone or cyclohexanone or other aliphatic, cycloaliphatic and mixed aliphatic aromatic ketones with the aforementioned alcohols.

It is necessary when carrying out the present polymerization process that the organic acid anhydride or alkylation agent to be used should be in a very pure form. For example, if acetic acid anhydride is used as solvent, it is advisable to remove, from the commercial product, small amounts of acetic acid together with acetic acid-anhydride by distillation, or for the acetic acid which is present to be converted with ketene into acetic anhydride and then for distillation to be carried out. In most cases, however, small quantities of acetic acid can still be detected, even after this initial purification. Carbodiimides are then added, whereby the acetic acid is quickly combined with formation of the corresponding acyl ureas, which are usually precipitated in crystallized form and if desired can be separated out. The carbodiimides may also be used for purifying the other acylating agents recited above.

Suitable carbodiimides are carbodiimides of the aliphatic, cycloaliphatic, araliphatic and aromatic series, both of symmetrical and asymmetrical structure. Such carbodiimides correspond for instance to the general formula: $R_1$—N=C=N—$R_2$ in which $R_1$ and $R_2$ stand for an alkyl group having 1 to 20, preferably 2 to 6 carbon atoms (methyl, ethyl, n-propyl, iso-propyl, n-butyl, tertiary butyl, hexyl, dodecyl, octadecyl), an aromatic group (phenyl, tolyl, ethyl phenyl, nitrophenyl, chlorophenyl, alkoxy phenyl such as methoxyphenyl, ethoxyphenyl, naphthyl), a cycloaliphatic group (cyclohexyl, methylcyclohexyl, cyclopentyl), an araliphatic group (benzyl). Examples of such compounds are diethyl carbodiimide, dicyclohexyl carbodiimide, methyl-n-propyl carbodiimide, dibenzyl carbodiimide, diphenyl carbodiimide and dinaphthyl carbodiimide, or substituted derivatives of the said carbodiimides. In addition, it is likewise possible to employ polyfunctional carbodiimides, i.e. organic compounds which contain at least two groups of the formula —N=C=N—, each free valency of the nitrogen atoms being saturated by a carbon atom forming part of an aliphatic, cycloaliphatic, araliphatic or aromatic hydrocarbon radical in which the aromatic groups may be substituted besides by hydrocarbon radicals, by nitro halogen or alkoxy groups. Compounds of this type correspond, for instance, to the general formula

$$R_2-N=C=N-R-N=C=N-R_1$$

in which formula $R_1$ and $R_2$ have the same meaning as above and R stands for a bivalent organic radical, such as alkylene having 2 to 8 carbon atoms, six-membered cycloalkylene which may be substituted by lower alkyl, arylene, such as phenylene, naphthalene which may be substituted as above, aralkylene, such as xylene. Examples of such carbodiimides are tetramethylene, ω,ω'-bis-tert.-butyl carbodiimide are mentioned as examples.

It is advantageous to use carbodiimides which comprise at least one nitrogen atom which in its turn is bonded to a secondary or tertiary carbon atom, such as for example methyl tert.-butyl carbodiimide, tertiary butyl isopropyl carbodiimide, di-tert.-butyl carbodiimide and others. Carbodiimides of this structure have a substantially smaller tendency to self-polymerization than aromatically substituted carbodiimides. Furthermore, their reaction products with acids which are acylated ureas show no tendency to form aromatic isocyanates at elevated temperatures. Further suitable carbodiimides are disclosed in our copending U.S. Patent Application Serial No. 1856 filed January 12, 1960.

If a solvent having an alkylating action, such as for example an ethyl ester of orthoformic or silicic acid, is used for carrying out the formaldehyde polymerization, attention is also to be paid here to the purity of the solvent in the interest of producing high chain lengths of the polymers, and chain-breaking impurities, such as for example ethyl alcohol, are to be removed. In one preferred form, traces of these compounds can be made harmless by a pretreatment of the said solvents with aromatic diisocyanates, such as toluene diisocyanate and diphenyl methane diisocyanate.

In order substantially to exclude the chain-breaking influence of free acids or free alcohols, it is additionally necessary to use a monomeric formaldehyde which entrains less than 0.5 percent of water into the reaction medium. A formaldehyde having a water content below 0.1 percent will generally be employed.

The polymerization of monomeric gaseous or liquid formaldehyde is now carried out in the acylation or alkylation agents disclosed above, or in solutions thereof in anhydrous inert organic solvents. The liquid acylating and alkylating agents may be used in amounts of 2 to 20 parts by volume, and the inert solvents in amounts of 2 to 80 parts by volume for each part by weight of formaldehyde. Suitable solvents are for example cyclic and acyclic ethers, such as dimethyl ether, diethyl ether, dipropyl ether, dibutyl ether, di-tert.butyl ether, methyl-tert.butyl ether, dioxan, tetrahydrofuran, esters, especially esters of saturated alcohols with saturated carboxylic acids, such as propylacetate, butylacetate, aliphatic, cycloaliphatic aromatic hydrocarbons, such as butane, hexane, heptane, cyclohexane, benzene, toluene, xylene, halogenated, especially chlorinated hydrocarbons, such as methylenedichloride, chloroform, carbontetrachloride, ethylenedichloride, chlorobenzene, dichlorobenzene. The formaldehyde is introduced in a gaseous form into the reaction medium, preferably in accordance with a process of Staudinger (see "Die hochmolekularen organischen Verbindungen," Verlag Julius Springer, Berlin, 19 1932, page 286). In this operation, it is advantageous to dilute the formaldehyde with a neutral gas, such as for example nitrogen. The polymerization of the formaldehyde is activated by means of known catalysts, such as for example tertiary nitrogen organic bases, alkali metal salts of fatty acids, quaternary ammonium, sulphonium and phosphonium bases and their salts, boron fluoride, aluminium chloride, organometallic compounds, such as for example Grignard compounds, aluminum alkyls, boron alkyl, adducts of 1 mol of borontrifluoride, irontrichloride, antimonypentachloride or aluminium trichloride with 1 mol of an aliphatic, cycloaliphatic, araliphatic or cyclic ether, or of a corresponding mixed ether, such as diethyl-, dipropyl-, diisopropyl-, ethylisopropyl-, ditert.-butyl-, methyl-tert,-butyl-, dicyclohexyl-, dibenzyzl-, diphenylethyl-, ethyl benzyl ether, tetrahydrofuran, dioxan, tetrahydropyran, furan, pyran, secondary oxonium salts of the aforementioned ethers with halogeno acids having for example the following anions: $SbCl_6^-$, $BCl_4^-$, $FeCl_4^-$, $BiCl_4^-$, $AlCl_4^-$, $SnCl_6^{--}$, $ZnCl_3^-$, tertiary oxonium salts of the aforementioned ethers having the above-cited anions which are obtained by reacting the above-cited adducts of ethers and borontrifluoride etc. with epichlorohydrin or by reacting tertiary oxonium salts with ethers which are different from those used for the preparation of the tertiary oxonium salts (compare Ber. 89, 2071 (1956)), or by the known reactions which lead to benzoid tertiary oxonium salts, such as pyrylium salts. Examples of such oxonium salts are diethyloxonium-hexachloro-antimonate, diethyloxonium-tetrachloroferrate, diisopropyloxonium-tetrafluoroborate, methyl-tert.butyl-oxonium-tetrafluoroborate, trialkyl oxonium fluoroborates, such as trimethyl-, triethyl-, triisopropyl-, diisopropyl-ethyl-, dimethyl-tert.butyl- oxonium fluoborate, ethyl tetramethylene oxonium fluoborate; trimethyl-, triethyl-oxonium-tetrachloro aluminate; triethyl-, ethylpentamethylene-oxonium-hexachloroantimonate; 1-ethyl-1.4-dioxonium-hexachloroantimonate. Furthermore those oxonium salt mixtures may be used which are obtained by reacting at room temperature 1 mol of a tertiary oxonium salt with about 2 to 8 mols of an acetal and/or a ketal, such as formaldehyde and acetaldehyde dimethyl acetal, formaldehyde diisopropyl acetal, acetone dimethyl ketal, acetone dibenzyl ketal, cyclohexanonedimethyl ketal. In a preferred manner, it is possible to utilize the catalytic action of the aforementioned carbodiimides themselves (see the process of our U.S. patent application Serial No. 7523, filed February 9, 1960, now U.S. Patent No. 3,072,610).

The concentration of the catalysts which are employed depends on the desired molecular weight of the polymers. If conventional catalysts are used in a quantity of more than 1 percent by weight of the reaction medium, there are mainly obtained polymers with a molecular weight between about 3000 and 5000, while at lower concentrations, the polyoxymethylenes obtained show higher molecular weights. If a carbodiimide and for example diisopropyl carbodiimide is used as catalyst, it has proved to be desirable to introduce this catalyst in quantities of 0.1–0.00001 mol/1000 parts by volume of reaction medium. Oxonium salts as catalysts can readily be used in quantities within the same range. Preferably a quantity of 0.001 to 0.0001 mol/parts by volume of reaction medium is used. It is generally advisable for the polymerization of formaldehyde to add polymerization catalysts, but this is not by any means necessary in all cases, since a number of solvents with an alkylating action, such as for example silicic acid tetraethyl ester, boric acid trialkyl ester and titanic acid tetraalkyl ester, are themselves already polymerization catalysts for formaldehyde.

The reaction temperature to be maintained depends on the reactivity of the acylating or alkylating agents, on the solubility of these agents in organic solvents and on the solidification point of the liquid medium being used. It has proved desirable to carry out the polymerization at a temperature between about $-70°$ and $+50°$ C., and preferably at temperatures between $-30°$ and $+20°$ C., since at these temperatures chain-breaking reactions which are caused by the acylating or alkylating agents are suppressed to a considerable degree. In case that trioxymethylene is used instead of monomeric formaldehyde, the polymerization temperature is adjusted to about $+10$ to $120°$ C.

After having carried out polymerization, the temperature of the reaction medium is raised to about 80 to 180° C., preferably 130 to 174° C., in order to complete acylation or alkylation. If polymerization has taken place in or in the presence of acylating solvents, a carbodiimide may be added, as disclosed in our copending U.S. patent application Serial No. 1856, filed January 12, 1960, and acetylation takes place at elevated temperature, for example between 130 and 174° C., if necessary under pressure, it also being possible to add other acylation catalysts, such as for example tertiary nitrogen bases, sodium acetate and the like. If polymerization has taken place in alkylating solvents, it is usually necessary after polymerization has occurred to add acid catalysts, such as for example ammonium nitrate, boron trifluoride, the aforementioned adducts of boron trifluride and ethers, oxonium salts; furthermore aluminum chloride, tin tetrachloride and others.

The process according to the present invention makes it possible for acylating and alkylating agents to be used as the reaction medium for the polymerization of formaldehyde. This working procedure provides the important advantage that the stabilization of the primarily obtained polyoxymethylenes can be effected immediately and without changing the solvent. This circumstance is of particular importance, firstly because the primarily obtained polymerization products are largely permeated by the alkylation and acylation agents which per se do not dissolve the polymer. This produces the possibility of an improved reaction of the terminal groups, or the acylation or akylation otherwise heterogeneously only slowly operative from the surface of the polyoxymethylene crystallites can in this case proceed considerably more easily. Secondly, the process according to the invention obviates the necessity for the separation of neutral organic solvents, which are frequently found in quantities of up to 600% in relation to the polyoxymethylenes in the otherwise usual working method and have to be removed prior to the subsequent stabilization.

The polyoxymethylenes and their alkyl or acyl derivatives obtained by the process according to the invention, where they have a degree of polymerization up to 300, are valuable compounds which can be used as masked cross-linking agents in the cross-linking of polyurethanes.

Where the same compounds have degrees of polymerization above 400, they represent valuable thermoplastic plastics, which can be processed to form hard and tough moulded structures such as films, plates, die-cast elements, fibres and the like.

Example 1

The acetic acid anhydride used for the polymerization procedure hereinafter described was subjected to the following pretreatment: after separation of acetic acid by distillation, 3000 parts by weight of acetic acid anhydride were mixed with 70 parts by weight of diisopropyl carbodiimide and the N,N'-diisopropyl-N-acetylurea (93 parts by weight) separating out was removed after a few hours. A quantity of carbodiimide which is to act as catalyst in the subsequent polymerization and which corresponds to a content of about 0.25%, based on the acetic acid anhydride employed, remains.

(a) 1000 parts by weight of paraformaldehyde are thermally decomposed and the monomeric formaldehyde substantially freed from water. Residual water is removed by freezing out in several cooling traps kept at −20° C. until only traces are left. The formaldehyde purified in this way then flows, admixed with nitrogen, into a reaction vessel which is charged with 3000 parts by weight of acetic acid anhydride and which is provided with a powerful stirrer mechanism and kept at −20° C. Strong polymerization commences after a short time and the heat produced is discharged through a cooling brine kept at −21° C. After four hours, 500 parts by weight of polyoxymethylene melting at 169° C. can be filtered off; the product is acetylated by adding 90 parts by weight of diisopropyl carbodiimide and 6 parts by weight of sodium acetate and by heating for one hour at 139° C. to form polyoxymethylene diacetates.

Yield: 460 g. calculated on formaldehyde (700 parts by weight) actually passed through the reaction vessel= 66%. Formaldehyde which has not polymerized is converted into a concentrated formaldehyde solution.

(b) If the procedure set out under (a) is generally followed, but with the modification that only an equivalent quantity of diisopropyl carbodiimide is used for fixing the acetic acid, and 2 parts by weight of tri-n-butylamine are used as polymerization catalyst, 480 parts by weight of polyoxymethylene are obtained after polymerization and filtration, the M.P. thereof being 169–170° C. Yield, based on formaldehyde (700 g.) actually passed through the reaction vessel: 68%.

Example 2

The procedure is as described in Example 1, but using as polymerization medium a mixture of 2600 parts by weight of toluene and 400 parts by weight of benzoic acid anhydride, which had been subjected to a pretreatment analogous to Example 1 (first paragraph) with dicyclohexyl carbodiimide. After polymerization, a polyoxymethylene having an M.P. of 169° C. is obtained.

Yield: 400 g. which is 56% based on formaldehyde (700 parts by weight) actually passed through the reaction vessel. Formaldehyde which has not polymerized is converted into a concentrated formalin solution.

Example 3

Using orthoformic acid ethyl ester as reaction medium, the pretreatment necessary for the production of polyoxymethylene of high molecular weight is carried out by boiling 480 parts by weight of orthoformic acid ethyl ester under reflux for 1 hour with 30 parts by weight of diphenylmethane-4,4'-diisocyanate and thereafter distilling.

For the polymerization, 150 parts by weight of paraformaldehyde are subjected to thermal decomposition according to Example 1 and freed from water except for traces thereof. The stream of purified formaldehyde passes together with a weak stream of nitrogen into a reaction vessel which is charged with 400 parts by weight of predetreated orthoformic acid ethyl ester and contains 0.038 part by weight of diisopropyl carbodiimide as polymerization catalyst. Strong polymerization commences after a short time. The temperature is kept at −150° C. during the polymerization and leads after about 3 hours to 80 parts by weight of a polyoxymethylene of higher molecular weight and having a M.P. of 169–170° C. The yield, based on formaldehyde (90 g.) actually passed through the reaction vessel is 88%.

If the terminal groups of the polyoxymethylenes are alkylated directly after polymerization, 0.080 part by weight of boron trifluoride ethereate is added and the reaction mixture is heated for about 3 to 5 hours to reflux temperature. After filtration and washing the polyoxymethylene several times with acetone, 70 parts by weight of a substantially 75% ethylated polyoxymethylene are obtained.

Example 4

The procedure is as set forth in Example 3, but replacing orthoformic acid ethyl ester by 400 parts by weight of silicic acid tetraethyl ester, no polymerization catalyst being added in this case. A polyoxymethylene is obtained with substantially an equally good yield, and after the said polyoxymethylene has been separated, washed with water and dried in vacuo at 60° C., it has a melting point of 170° C. The alkylation is carried out in a manner analogous to Example 3 by heating the reaction mixture, after adding boron trifluoride etherate, to temperatures between 60 and 100° C. over a period of a few hours.

Example 5

150 parts by weight of paraformaldehyde are subjected to thermal decomposition in accordance with Example 1 and freed from water except for traces thereof. The stream of purified gaseous formaldehyde passes together with a weak stream of nitrogen into a reaction vessel containing 800 parts by weight of cyclohexane, 50 parts by weight of orthoformic acid ethyl ester and 0.3 part by weight of triethyl oxonium fluoborate. Strong polymeridation commences after a short time, and during this period the temperature is kept at −20° C. After about 3 hours, 80 parts by weight of a polyoxymethylene of a M.P. of 171 to 172° C. are obtained. The yield, based on formaldehyde (90 parts by weight) actually passed through the reaction vessel is 88%.

If the complete alkylation of the terminal groups of the polyoxymethylenes is carried out immediately following the polymerization, the reaction mixture is heated without any further addition for about 3–5 hours to reflux temperature. After filtration, followed by washing the polyoxymethylene with acetone, dilute methanolic sodium hydroxide solution and methanol, 75 parts by weight of an alkylated polyoxymethylene are obtained.

Example 6

The procedure is analogous to that of Example 5 and 90 parts by weight of anhydrous gaseous formaldehyde are introduced into a mixture of 600 parts by weight of di-tert.-butylether, 200 parts by weight of formaldehyde dimethyl acetal and 0.080 part by weight of boron trifluoride. The polymerization temperature is kept at −150° C. After about 3 hours, 83 parts by weight of a polyoxymethylene of high molecular weight are obtained, this substance melting at 168 to 169° C. The yield, base on formaldehyde (90 parts by weight) actually passed through the reaction vessel is 82 parts by weight (=91%).

A complete alkylation of the terminal groups of the resulting partially alkylated polyoxymethylene is obtained by the product, after adding about 250 parts by weight of orthoformic acid ethyl ester, being heated for a period between 3 and 5 hours to reflux temperature. The reaction product is filtered off and washed with acetone, dilute methanolic sodium hydroxide solution and methanol.

*Example 7*

A mixture of 100 parts by weight of trioxane, 800 parts by weight of methyl tert.-butylether, 10 parts by weight of orthoformic acid ethyl ester and 0.2 part by weight of antimony trifluoride are heated in an evacuated, enamelled autoclave for 30 hours at 85° C. 97 parts by weight of a polyoxymethylene of high molecular weight are obtained, and this polyoxymethylene is completely alkylated, using a similar after treatment to that of Example 6, by heating at reflux temperature for a period within 3 hours with 400 parts by weight of orthoformic acid ethyl ester. M.P. 172–173° C.

*Example 8*

For the polymerization, 90 parts by weight of trioxane are subjected to the thermal decomposition. The stream of purified formaldehyde passes together with small quantities of concurrently sublimed trioxane into a reaction vessel which is charged with 100 parts by weight of cyclohexane and 700 parts by weight of acetaldehyde dimethyl acetal. As catalyst for the polymerization or alkylation, the mixture contains in concurrent experiments:

(a) 0.040 part by weight of diethyloxonium tetrachloroferrate- (III)-etherate
(b) 0.030 part by weight of trimethyl oxonium fluorborate
(c) 0.050 part by weight of ethyl tetramethylene oxonium hexachloroantimonate
(d) 0.090 part by weight of 0-ethyl dibenzalacetonium tetrachloroaluminate:

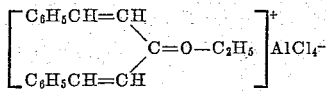

(e) 0.45 part by weight of 0-ethyl-dimethylformamidium-tetrafluoborate
(f) 0.055 part by weight of 2-ethoxy-1-oxacyclopent-1-enium-fluorate:

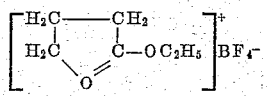

(g) 0.050 part by weight of 2-methyl-1,3-dioxolenium-fluoborate
(h) 0.95 part by weight of 2-ethoxy-benzopyrylium-fluoborate
(i) 0.1 part by weight of 2,4,6-triphenyl-pyrylium-tetrachloro-ferrate-(III).

The polymerization temperature is kept at −15° C. After about 3 hours, and when using the catalysts listed under (a) to (i), 75 to 82 parts by weight of polyoxymethylene of high molecular weight are obtained. Softening point: 167–172° C. By means of an aftertreatment as described in Example 6, a complete alkylation is achieved by heating for 3 to 5 hours at reflux temperature in the presence of orthoformic acid ethyl ester.

We claim:
1. A process for the production of high molecular weight polyoxymethylenes having no free terminal hydroxyl group in the polyoxymethylene chain which comprises polymerizing substantially anhydrous formaldehyde at a temperature between −70 and +50° C. in the presence of catalytic amounts of a carbodiimide selected from the group consisting of an alkyl-, a cyclo-alkyl-, an aryl- and an aralkylcarbodiimide in a reaction medium which is a reagent for hydroxyl groups, which reagent is selected from the group consisting of an alkyl carboxylic acid anhydride, an aryl carboxylic acid anhydride, an orthoformic acid trialkylester, a silicic acid tetraalkylester, methyl-tert.butylether, and an alkylaldehyde-dimethylacetal, and at the conclusion of the formaldehyde polymerization raising the temperature of said reaction medium to at least 80° C. to permit it to react with hydroxyl groups, and recovering a polyoxymethylene having no free terminal hydroxyl group in the polyoxymethylene chain.

2. The process of claim 1 wherein said reagent for hydroxyl groups is an acetic acid anhydride and said carbodiimide is diisopropyl carbodiimide.

3. The process of claim 1 wherein said reagent for hydroxyl groups is orthoformic acid triethylester and said carbodiimide is diisopropyl carbodiimide.

4. The process of claim 1 wherein said reagent for hydroxyl groups is silicic acid tetraethylester and said carbodiimide is diisopropyl carbodiimide.

5. The process of claim 1 wherein said reagent for hydroxyl groups is formaldehyde dimethylacetal and said carbodiimide is diisopropyl carbodiimide.

References Cited in the file of this patent

UNITED STATES PATENTS

| 2,686,180 | Schmidt et al. | Aug. 10, 1954 |
| 2,998,409 | Nogare et al. | Aug. 29, 1961 |

FOREIGN PATENTS

| 770,717 | Great Britain | Mar. 20, 1957 |